US012560004B2

(12) United States Patent
Xiao

(10) Patent No.: US 12,560,004 B2
(45) Date of Patent: Feb. 24, 2026

(54) FULL-AUTOMATIC SINGLE BOLT LOCK BODY WITH A BUILT-IN MOTOR

(71) Applicant: Foshan Wangya Intelligent Technology Co., Ltd., Foshan (CN)

(72) Inventor: Muxiang Xiao, Qingyuan Guangdong (CN)

(73) Assignee: Foshan Wangya Intelligent Technology Co., Ltd., Foshan (CN)

( * ) Notice: Subject to any disclaimer, the term of this patent is extended or adjusted under 35 U.S.C. 154(b) by 69 days.

(21) Appl. No.: 18/641,332

(22) Filed: Apr. 20, 2024

(65) Prior Publication Data

US 2025/0250829 A1 Aug. 7, 2025

(30) Foreign Application Priority Data

Feb. 4, 2024 (CN) ......................... 202410158048.9
Feb. 4, 2024 (CN) ......................... 202420276599.0

(51) Int. Cl.
*E05C 1/08* (2006.01)
*E05C 1/10* (2006.01)

(52) U.S. Cl.
CPC ................ *E05C 1/085* (2013.01); *E05C 1/10* (2013.01)

(58) Field of Classification Search
CPC ........ E05C 1/085; E05C 1/10; Y10T 292/097; Y10T 292/096; Y10T 292/1014; Y10T 292/1082; Y10T 292/1021; E05B 17/0029; E05B 47/0012; E05B 2047/0037; E05B 2015/0437; E05B 2015/0441; E05B 2015/0448; E05B 2015/0403; E05B 15/04; E05B 15/101
See application file for complete search history.

(56) References Cited

U.S. PATENT DOCUMENTS 3,881,332 A * 5/1975 Ballew, Sr. ........... E05B 47/026 292/164
5,246,258 A * 9/1993 Kerschenbaum ... E05B 47/0002 70/279.1

(Continued)

FOREIGN PATENT DOCUMENTS

CN 101171393 A * 4/2008 ............. H01H 23/30
CN 202227801 U * 5/2012 ............. E05B 47/02

(Continued)

OTHER PUBLICATIONS

CN11173385 Espacenet machine translation claims and description (Year: 2025).*

*Primary Examiner* — Steven A Tullia
(74) *Attorney, Agent, or Firm* — Birchwood IP

(57) ABSTRACT

A full-automatic single bolt lock body with a built-in motor is disclosed, including a lock case, a lock bolt, and a drive unit. An end of the lock case is provided with a lock bolt hole for extending and retracting the lock bolt, the drive unit is mounted in the lock case and is connected to the lock bolt. The drive unit includes the built-in motor, the built-in motor is mounted at a rear side of the lock bolt, an axial direction of the motor is in the same direction as a telescopic movement of the lock bolt, and the lock bolt realizes actions of extending and retracting the lock bolt hole based on a rotation of the motor. By such designs, the lock body of the present disclosure has high versatility.

9 Claims, 10 Drawing Sheets

(56) References Cited

U.S. PATENT DOCUMENTS

| | | | | | |
|---|---|---|---|---|---|
| 5,263,751 | A * | 11/1993 | Priest | E05B 79/20 | 292/201 |
| 5,473,922 | A * | 12/1995 | Bair | E05B 47/026 | 292/144 |
| 5,911,460 | A * | 6/1999 | Hawkins | E05B 63/248 | 292/144 |
| 6,919,797 | B2 * | 7/2005 | Hsieh | E05B 47/0607 | 292/201 |
| 7,059,159 | B2 * | 6/2006 | Lanigan | B62D 33/0222 | 292/144 |
| 8,302,438 | B2 * | 11/2012 | Lui | E05B 47/0673 | 74/411 |
| 8,739,586 | B2 * | 6/2014 | Yuan | F16F 1/04 | 292/144 |
| 10,047,544 | B2 * | 8/2018 | Yen | E05B 47/0012 | |
| 10,316,548 | B2 * | 6/2019 | Yuan | E05B 47/0012 | |
| 10,550,602 | B2 * | 2/2020 | Boutelegier | E05B 47/0001 | |
| 10,669,747 | B2 * | 6/2020 | Yuan | E05B 17/208 | |
| 11,053,710 | B2 * | 7/2021 | Häussler | E05C 1/002 | |
| 11,181,231 | B2 * | 11/2021 | Grimm | H01H 27/007 | |
| 11,629,533 | B2 * | 4/2023 | Schroll | E05B 63/0073 | 292/137 |
| 11,846,120 | B2 * | 12/2023 | Hill | E05B 47/0012 | |
| 11,988,021 | B2 * | 5/2024 | Qiu | E05B 47/0004 | |
| 12,139,935 | B2 * | 11/2024 | Wong | E05B 63/244 | |
| 2006/0186673 | A1 * | 8/2006 | Wong | E05C 1/04 | 292/175 |
| 2017/0204636 | A1 * | 7/2017 | Sack | G07C 9/00309 | |

FOREIGN PATENT DOCUMENTS

| | | | | | |
|---|---|---|---|---|---|
| CN | 101324163 | B | * | 3/2013 | E05B 47/0607 |
| CN | 102953598 | A | * | 3/2013 | F16F 1/04 |
| CN | 105863393 | A | * | 8/2016 | E05B 17/2019 |
| CN | 205577647 | U | * | 9/2016 | E05B 47/00 |
| CN | 108071275 | A | * | 5/2018 | E05B 47/0001 |
| CN | 108166851 | A | * | 6/2018 | E05B 47/0012 |
| CN | 108915421 | A | * | 11/2018 | E05B 47/0002 |
| CN | 110145178 | A | * | 8/2019 | E05B 1/00 |
| CN | 110374420 | A | * | 10/2019 | E05B 63/146 |
| CN | 111140106 | A | * | 5/2020 | E05B 67/22 |
| CN | 111173385 | A | * | 5/2020 | E05B 15/04 |
| CN | 112144988 | A | * | 12/2020 | E05B 17/10 |
| CN | 112227838 | A | * | 1/2021 | G07C 9/00896 |
| CN | 112227839 | A | * | 1/2021 | G07F 11/00 |
| CN | 116556775 | A | * | 8/2023 | E05B 47/0012 |
| DE | 102004007400 | A1 | * | 9/2005 | E05B 47/0012 |
| DE | 19714612 | B4 | * | 11/2007 | E05B 47/0012 |
| EP | 0321626 | A1 | * | 6/1989 | G07C 9/00714 |
| EP | 2636822 | A2 | * | 9/2013 | E05B 47/0012 |
| EP | 3346076 | A1 | * | 7/2018 | E05B 71/00 |
| FR | 2634508 | A2 | * | 1/1990 | E05B 47/0012 |
| FR | 2653480 | A1 | * | 4/1991 | E05B 15/101 |
| GB | 2274307 | A | * | 7/1994 | E05B 47/0661 |
| GB | 2451185 | A | * | 1/2009 | B60R 25/02118 |
| KR | 20230146771 | A | * | 10/2023 | E05B 63/08 |
| TW | 1458882 | B | * | 11/2014 | E05B 47/0642 |
| WO | WO-8704213 | A1 | * | 7/1987 | E05B 47/026 |
| WO | WO-03089743 | A1 | * | 10/2003 | E05B 47/0012 |
| WO | WO-2005088046 | A1 | * | 9/2005 | E05C 5/00 |

* cited by examiner

FULL-AUTOMATIC SINGLE BOLT LOCK BODY WITH A BUILT-IN MOTOR

TECHNICAL FIELD

The present application relates to the technical field of door locks, and in particular to a full-automatic single bolt lock body with a built-in motor.

BACKGROUND

With development and progress of science and technology, applications of smart devices in modern homes are also more and more, and many families and studios are using smart door locks, because the smart door locks have advantages of easy switching, no need to carry keys, and high security.

However, in existing smart door lock, due to limitations of installation space of a door lock hole and a position of a door lock panel, as well as the door lock has more complex structure of a lock body and also more parts, a motor used to control an action of a lock bolt is generally used externally in a handle or a panel of the door lock. When the door lock is installed, the door lock protrudes out of the door body with a larger portion, thus it is necessary to use the door lock panel to cover it, which affecting aesthetics of the door lock. Moreover, the door lock requires a larger installation space when installing, corresponding to the lock body has a poor versatility, which is difficult to realize the installation in different door body. Therefore there is a need for a full-automatic single bolt lock body with a built-in motor.

SUMMARY

The present disclosure aims to provide a full-automatic single bolt lock body with a built-in motor to address defects in existing technologies.

To achieve above objectives, the present disclosure adopts following technical solutions. In some embodiments of the present disclosure, a full-automatic single bolt lock body with a built-in motor is provided, including a lock case, a lock bolt, and a drive unit. Herein an end of the lock case is provided with a lock bolt hole for extending and retracting the lock bolt, the drive unit is mounted in the lock case and is connected to the lock bolt. The drive unit includes a motor (that is the built-in motor), the motor is mounted at a rear side of the lock bolt, an axial direction of the motor is in the same direction as a telescopic movement of the lock bolt, and the lock bolt realizes actions of extending and retracting the lock bolt hole based on a rotation of the motor.

In some embodiments of the present disclosure, the drive unit further includes a rotating shaft connected to the motor, a drive spring for driving and controlling a movement of the lock bolt, and a reset spring for elastic extension return after the lock bolt has retracted. Herein an outer side of the rotating shaft is provided with a guide post projecting along a radial direction, one end of the drive spring is sleeved on the outer side of the rotating shaft, the guide post passes through a pitch of the drive spring and is movably fitted with the drive spring, the other end of the drive spring is connected to the lock bolt in a restricted manner, and the reset spring rests against the rear side of the lock bolt.

In some embodiments of the present disclosure, the drive spring has an elastic coefficient greater than an elastic coefficient of the reset spring.

In some embodiments of the present disclosure, the lock bolt includes a lock bolt body and a rear sealing plate. Herein the lock bolt body inside is provided with a movable cavity for accommodating the drive spring, the movable cavity passes through a rear face of the lock bolt body, and the drive spring is mounted in the movable cavity. The rear sealing plate is fixedly connected to the rear face of the lock bolt body to enclose the drive spring in the movable cavity, and the rear sealing plate is opened with a movable through hole connected to the movable cavity, and an end of the rotating shaft passes through the movable through hole to connect the drive spring.

In some embodiments of the present disclosure, an outer side of the movable cavity is provided with a limit slot for restricting rotations of the drive spring, and a head of the drive spring is snap-fitted in the limit slot.

In some embodiments of the present disclosure, the lock case inside is further mounted with a handle connection component for connecting a handle, the handle connection component includes a rotating member provided with a handle hole, a handle seat for positioning and mounting the rotating member, and a pull rod for connecting the lock bolt. The rotating member is mounted in the handle seat, and the handle seat is movably mounted in the lock case. The pull rod is opened with at least two positioning holes for positioning a position of the handle connection component, and an outer side of the rotating member is provided with a push block for positioning in conjunction with the positioning holes.

In some embodiments of the present disclosure, an outer side of the lock bolt is provided with a slide groove, an end of the pull rod is provided with a connecting hook for sliding fit with the slide groove, and a rear end of the slide groove is closed by the rear sealing plate. The connecting hook is hooked to an end face of the rear sealing plate when the lock bolt is in a fully extended state and the connecting hook slides inside the slide groove when the lock bolt is retracted backwardly under a drive of the motor or under a compression of the lock bolt by an external force.

In some embodiments of the present disclosure, it is provided two slide grooves, the two slide grooves are symmetrically disposed with respect to a center on the outer side of the lock bolt, and a connecting groove is provided between the two slide grooves.

For the specific structure of the drive unit, the present disclosure also provides another technical solution. In some embodiments of the present disclosure, the drive unit includes a rotating shaft connected to the motor and a drive spring for driving and controlling a movement of the lock bolt. Herein an outer side of the rotating shaft is provided with a guide post projecting along a radial direction, one end of the drive spring is sleeved on the outer side of the rotating shaft, the guide post passes through a pitch of the drive spring and is movably fitted with the drive spring, the other end of the drive spring is connected to the lock bolt in a restricted manner, and the drive spring has a length longer than a travel of the lock bolt moving back and forth.

For the specific structure of the drive unit, the present disclosure still provides another technical solution. In some embodiments of the present disclosure, the drive unit includes a rotating shaft connected to the motor, and the rotating shaft is provided with external threads on an outer side of a front end thereon. The lock bolt is provided with threaded holes inside adapted to the external threads of the rotating shaft, and between the rotating shaft and the lock bolt is driven by means of the external threads and the threaded holes.

The present disclosure has at least following advantages and beneficial effects. By installing the drive unit in the lock case and the motor is arranged axially at the rear of the lock bolt, volume of the lock body can be reduced. In this way, when installing the lock body, the whole lock body is installed in the door body, and the lock body is hidden inside of the door body. Such installation convenience is high, and the installation of the lock body is less restricted by the installation of empty space, the lock body can be applied to most of the door body. Accordingly, since the drive unit, which drives actions of the lock bolt, is integrated in the lock case, there is no need to set up a raised structure at outside of the lock case, so that the panel position of the door lock can be set flexibly, and the versatility of the lock body is high.

DETAILED DESCRIPTION OF THE EMBODIMENTS

Figure 1:
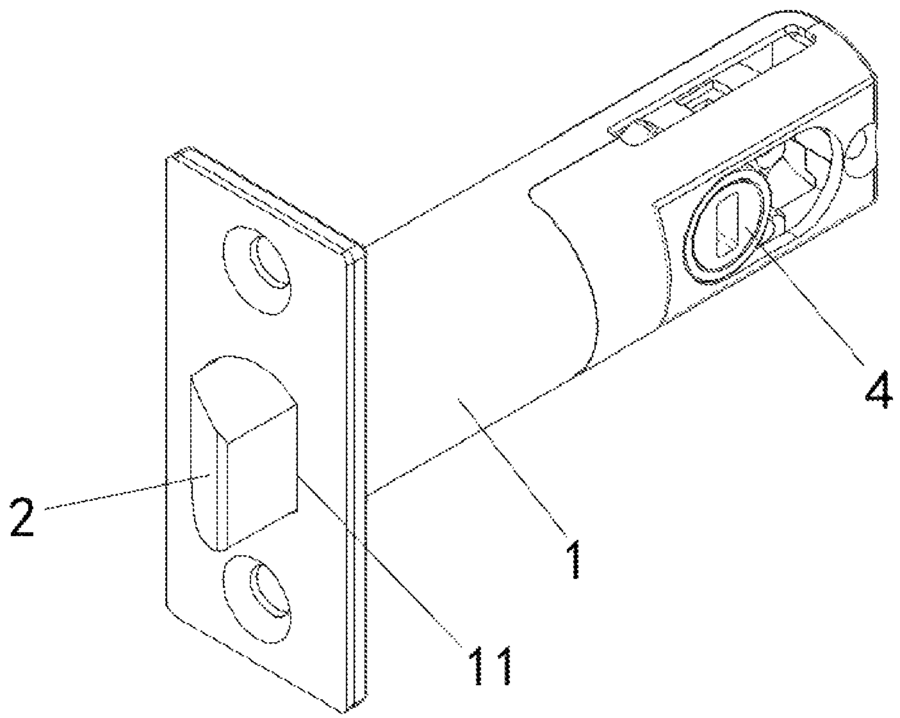
FIG. 1 shows an overall structure schematic diagram of a lock body in embodiment 1 of the present disclosure.
Figure 2:
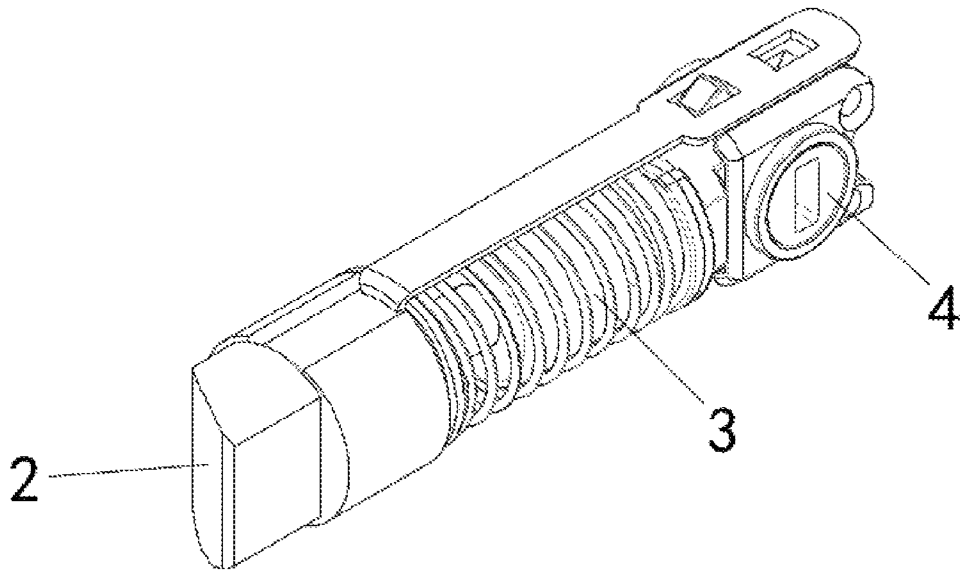
FIG. 2 shows an internal structure schematic diagram of the lock body in embodiment 1 of the present disclosure.
Figure 3:
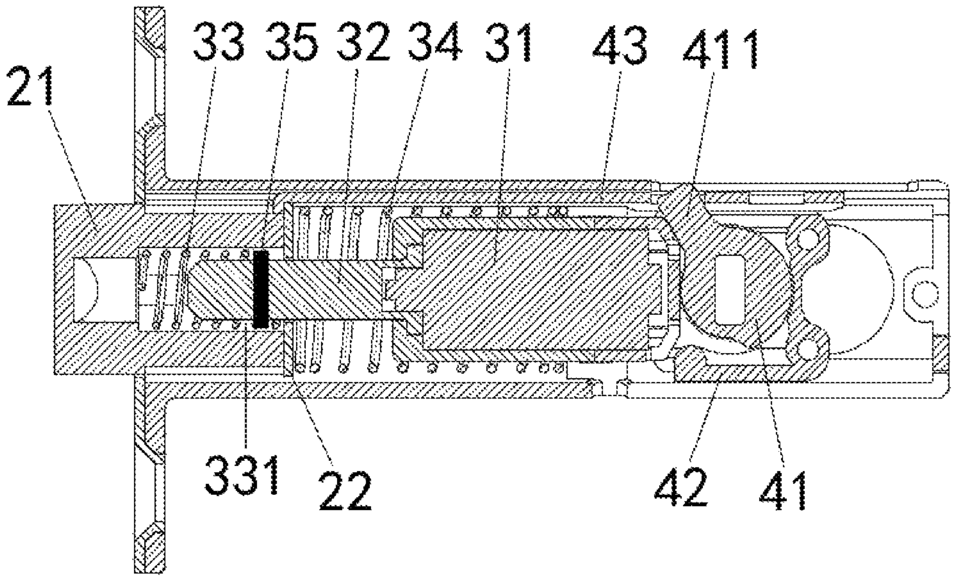
FIG. 3 shows a sectional structure schematic diagram of the lock body in embodiment 1 of the present disclosure.
Figure 4:
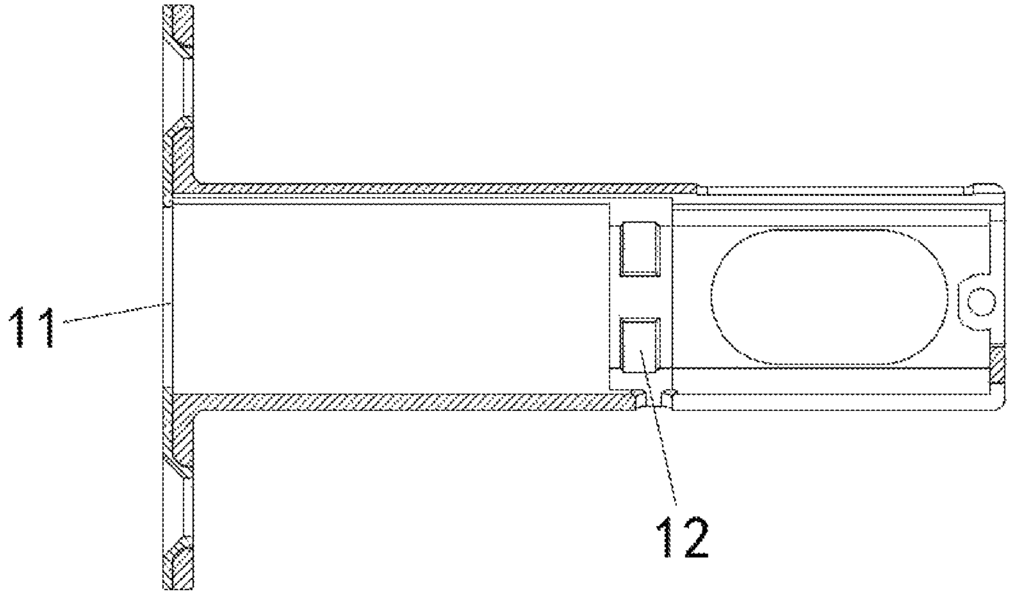
FIG. 4 shows a sectional structure schematic diagram of a lock case in embodiment 1 of the present disclosure.
Figure 5:
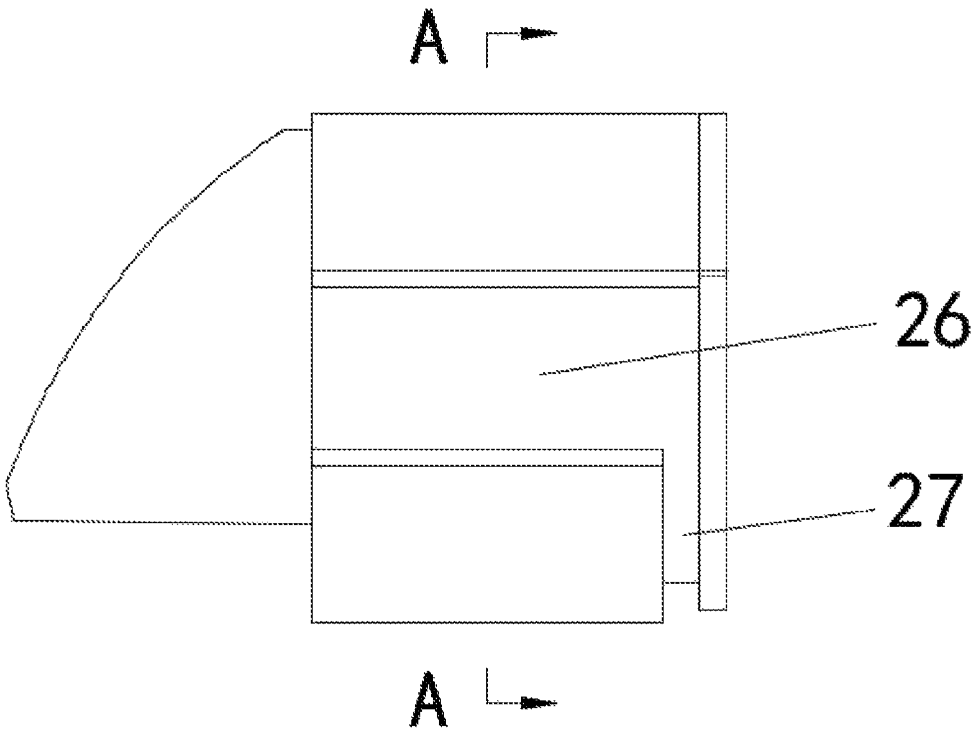
FIG. 5 shows an external structure schematic diagram of a lock bolt in embodiment 1 of the present disclosure.
Figure 6:
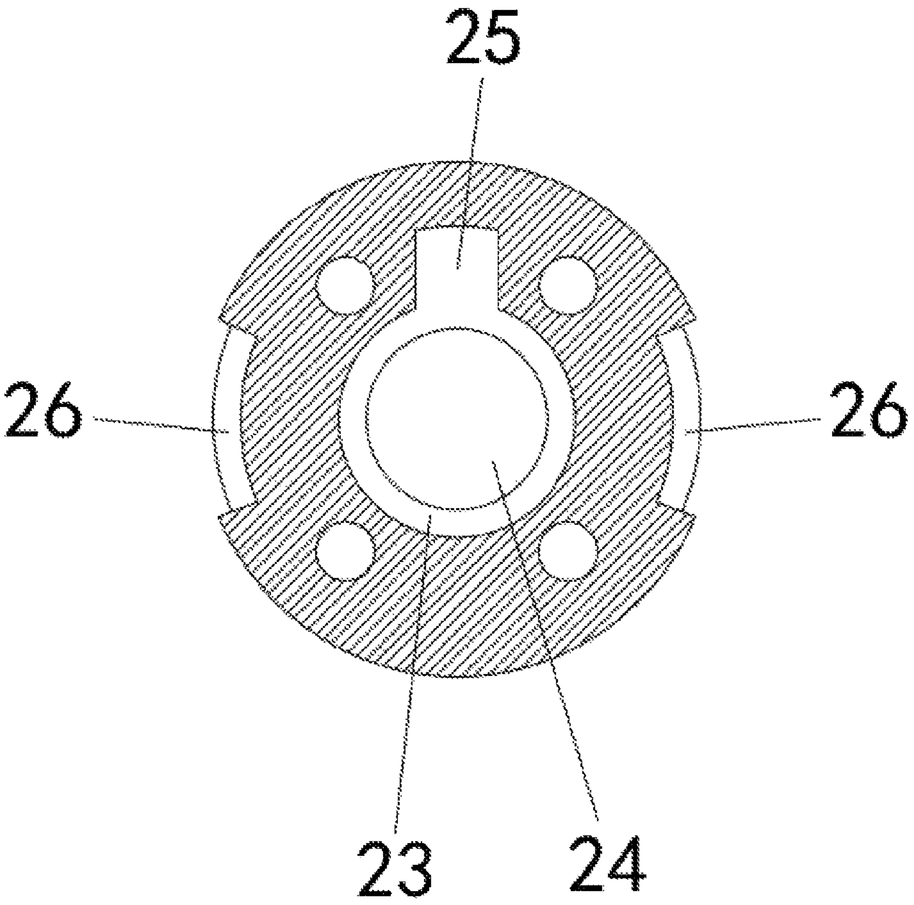
FIG. 6 shows a cross-sectional view of section A-A in FIG. 5.
Figure 7:
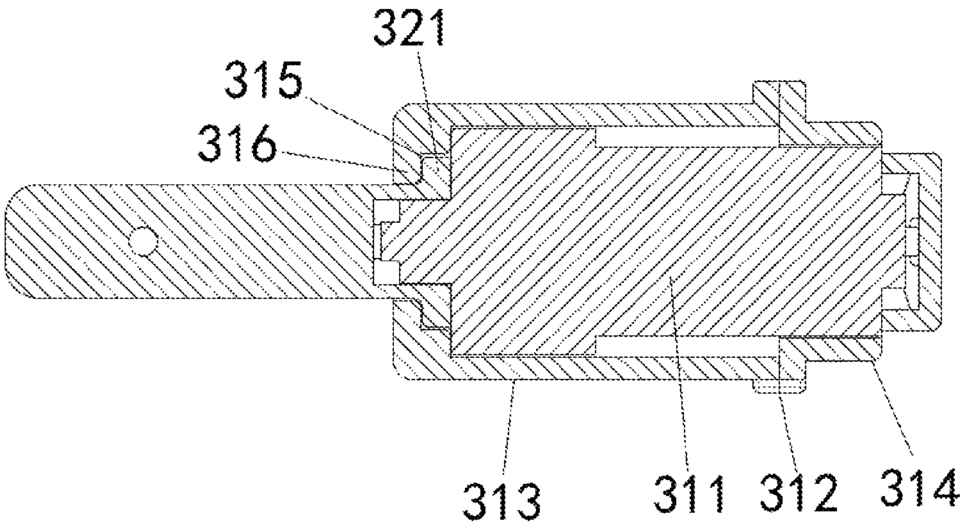
FIG. 7 shows a sectional structure schematic diagram of a motor connected to a rotating shaft in embodiment 1 of the present disclosure.
Figure 8:
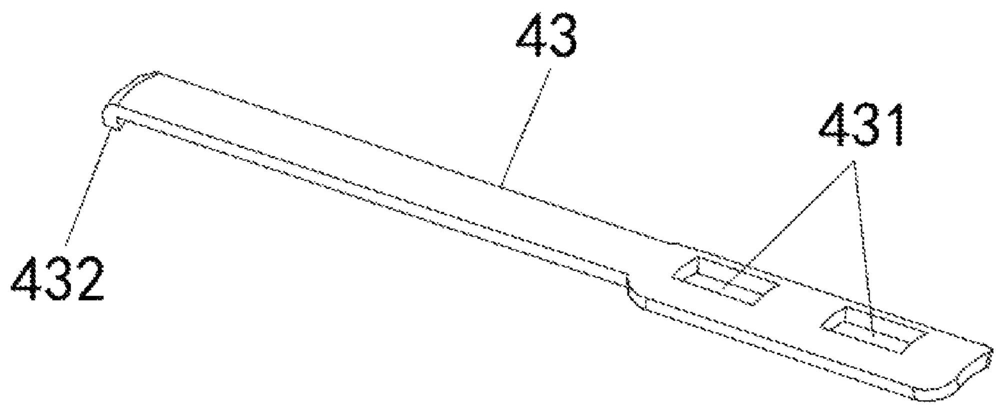
FIG. 8 shows a structure schematic diagram of a pull rod in embodiment 1 of the present disclosure.

In order to make the objectives, the technical solutions and advantages of the embodiments of the present disclosure clearer, the technical solutions in the embodiments of the present disclosure will be clearly and completely described below in conjunction with accompanying drawings in the embodiments of the present disclosure.

Specifically, there are a variety of embodiments for specific implementation structures for lock bodies, three of which are provided herein as follows.

Embodiment 1

Referring to FIG. 1 to FIG. 8, in the embodiment 1 of the present disclosure, a full-automatic single bolt lock body with a built-in motor 31 is provided, including a lock case 1, a lock bolt 2 and a drive unit 3. An end of the lock case 1 is provided with a lock bolt hole 11 for extending and retracting the lock bolt 2, the drive unit 3 is mounted in the lock case 1 and is connected to the lock bolt 2. The drive unit 3 includes a motor (that is the built-in motor) 31, the motor 31 is mounted at a rear side of the lock bolt 2, an axial direction of the motor 31 is in the same direction as a telescopic movement of the lock bolt 2, and the lock bolt 2 realizes actions of extending and retracting the lock bolt hole 11 based on a rotation of the motor 31. In the embodiment 1 of the present disclosure, by installing the drive unit 3 in the lock case 1 and the motor 31 is arranged axially at the rear of the lock bolt 2, volume of the lock body can be reduced. In this way, when installing the lock body, the whole lock body is installed in the door body, and the lock body is hidden inside of the door body. Such installation convenience is high, and the installation of the lock body is less restricted by the installation of empty space, the lock body can be applied to most of the door body. Accordingly, since the drive unit 3, which drives actions of the lock bolt 2, is integrated in the lock case, there is no need to set up a raised structure at outside of the lock case 1, so that a panel position of the door lock can be set flexibly, and the versatility of the lock body is high.

As a preferred embodiment of the present disclosure, the drive unit 3 further includes a rotating shaft 32 connected to the motor 31, a drive spring 33 for driving and controlling a movement of the lock bolt 2, and a reset spring 34 for elastic extension return after the lock bolt 2 has retracted. An outer side of the rotating shaft 32 is provided with a guide post 35 projecting along a radial direction, one end of the drive spring 33 is sleeved on the outer side of the rotating shaft 32, the guide post 35 passes through a pitch 331 of the drive spring 33 and is movably fitted with the drive spring 33, the other end of the drive spring 33 is connected to the lock bolt 2 in a restricted manner, and the reset spring 34 rests against the rear side of the lock bolt 2. The drive spring 33 has an elastic coefficient greater than the elastic coefficient of the reset spring 34. When the motor 31 rotates, the rotating shaft 32 is driven to rotate, and the guide post 35 on the outside of the rotating shaft 32 rotates along the pitch of the drive spring 33, at this time the drive spring 33 moves forward and backward under the transmission effect of the guide post 35, so that the lock bolt 2 is driven forward and backward telescopic movement by the drive spring 33. Due to the elasticity coefficient of the drive spring 33 is larger than that of the reset spring 34, the reset spring 34 is easier to be compressed than the drive spring 33, so when the motor 31 rotates to make the lock bolt 2 retracted, it is mainly that the reset spring 34 is compressed, while the compression of the drive spring 33 is very little, thus ensuring that the pitch 331 of the drive spring 33 has a sufficient width, so that the guide post 35 maintains an active fit with the drive spring 33, and the guide post is able to rotate along the pitch 331 of the drive spring 33, avoiding problems such as the guide post 35 being jammed in the pitch 331 of the drive spring 33 and unable to be active, and the motor 31 being obstructed in its rotation.

Specifically, the lock bolt 2 includes a lock bolt body 21 and a rear sealing plate 22. The lock bolt body 21 inside is provided with a movable cavity 23 for accommodating the drive spring 33, the movable cavity 23 passes through a rear face of the lock bolt body 21, and the drive spring 33 is mounted in the movable cavity. The rear sealing plate 22 is fixedly connected to the rear face of the lock bolt body 21 to enclose the drive spring 33 in the movable cavity 23, and the rear sealing plate 22 is opened with a movable through hole 24 connected to the movable cavity 23, and an end of the rotating shaft 32 passes through the movable through hole 24 to connect the drive spring 33. Preferably, in order to ensure the working precision of the lock body to ensure that the lock bolt 2 can be fully extended and retracted when the motor 31 drives the lock bolt 2 to extend and retract, the outer side of the movable cavity 23 is provided with a limiting groove 25 for restricting the rotation of the drive spring 33, and the head of the drive spring 33 is snap-fitted in the limiting groove 25. When the rotating shaft 32 rotates to drive the guide post 35 to rotate, the drive spring 33 will not rotate under the restriction of the limiting groove 25, but only move back and forth, so as to ensure that the rotation of the motor 31 is converted into a travel distance for the lock bolt 2 to move back and forth, making the lock bolt 2 can be fully extended and retracted. Specifically, the lock bolt body 21 and the rear sealing plate 22 may be of integral or separate construction.

In this embodiment of the present disclosure, the motor 31 includes a motor body 311 and a motor case set on an outside of the motor body 311. The motor case is provided with a raised structure 312 protruding outwardly thereon, and the lock case 1 is provided with a concave structure 12 inside that adapted to the raised structure 312. Between the motor 31 and the lock case 1 is mounted and positioned based on the raised structure 312 cooperating with the concave structure 12. The motor case includes a front case 313 and a rear case 314 abutted front to back, a rear end of the rotating shaft 32 is provided with a flange 321 protruding outwardly to periphery thereon, the front case 313 inside is provided with a recess 315 adapted to the flange 321, and a front side of the recess 315 is provided with a limiting ring 316 abutted an end face of the flange 321. The rear end of the rotating shaft 32 is abutted with a rotation axis of the motor body 311, and the connection between the rotating shaft 32 and the rotation axis of the motor body 311 is realized on the basis of mutual mating limitations between the flange 321 and the limit ring 316.

When installing the lock body, due to an hole position opened on the handle of the door body is various, it usually need to configure different specifications and models of the lock body to adapt the hole position, in order to improve adaptability of the lock body, so that it can be applied to the hole position of the handle with different lengths and distances, the lock case 1 inside is further mounted with a handle connection component 4 for connecting the handle. The handle connection component 4 includes a rotating member 41 provided with the handle hole, a handle seat 42 for positioning and mounting the rotating member 41, and a pull rod for connecting the lock bolt 2. The rotating member 41 is mounted in the handle seat 42, and the handle seat 42 is movably mounted in the lock case 1. The pull rod 43 is opened with at least two positioning holes 431 for positioning the position of the handle connection component 4, and an outer side of the rotating member 41 is provided with a push block 411 for positioning in conjunction with the positioning holes 431. By rotating the rotating member 41 along a positive direction, it can realize a connection and a release of cooperation between the push block 411 and the positioning holes 431. When the push block 411 cooperates with different positioning holes 431, making the handle connection component 4 move to a corresponding position, which corresponding to the hole position opened on the door body, and the lock body can be suitable for the door body with different lengths and distances of the hole position for the handle. When the push block 411 is connected to fit with the positioning holes 431, the rotating member 41 is driven to rotate along a reverse direction by the handle, and the pull rod is pulled to make the lock bolt 2 being retracted backward, at the same time the reset spring 34 is compressed, after the handle is loosened, the lock bolt 2 automatically extends forward to move under an action of the elasticity of the reset spring 34. An outer side of the lock bolt 2 is provided with a slide groove 26, an end of the pull rod 43 is provided with a connecting hook 432 for sliding fit with the slide groove 26, and a rear end of the slide groove 26 is closed by the rear sealing plate 22. The connecting hook 432 is hooked at an end face of the rear scaling plate 22 when the lock bolt 2 is in a fully extended state, and the connecting hook 432 slides inside the slide groove 26 when the lock bolt 2 is retracted backwardly under a drive of the motor 31 or under a compression of the lock bolt 2 by an external force. Moreover, the lock bolt 2 may be an oblique lock bolt 2 or a square lock bolt 2. When the lock bolt 2 is the oblique lock bolt 2, an installation direction of the lock bolt 2 will be different when the door body adopts an outward opening and an inward opening, in order to enable the installation direction of the lock bolt 2 to be converted into the positive or the reverse direction, the slide groove 26 is provided with two. The two slide grooves 26 are symmetrically disposed with respect to a center on the outer side of the lock bolt 2, and a connecting groove 27 is provided between the two slide grooves 26. The lock bolt 2 can be converted according to a direction of mounting, and when the direction of mounting of the lock bolt 2 is converted, the connecting hook 432 of the pull rod 43 shifts from one position connected to one slide groove 26 along the movement of the connecting groove 27 to the other position connected another slide groove 26.

Embodiment 2

Figure 9:
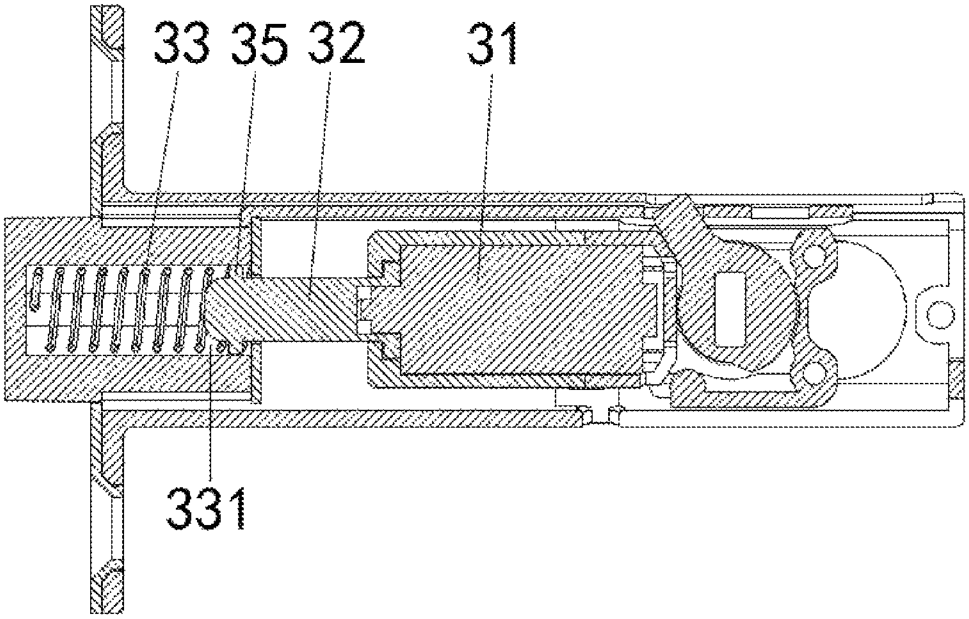
FIG. 9 shows a sectional structure schematic diagram of a lock body in embodiment 2 of the present disclosure.

Implementation of this embodiment is substantially the same as that of the Embodiment 1, except that a specific structural setup of the drive unit 3. Referring to FIG. 9, the drive unit 3 of this embodiment includes a rotating shaft 32 connected to the motor 31 and a drive spring 33 for driving and controlling a movement of the lock bolt 2. An outer side of the rotating shaft 32 is provided with a guide post 35 projecting along a radial direction, one end of the drive spring 33 is sleeved on the outer side of the rotating shaft 32, the guide post 35 passes through a pitch 331 of the drive spring 33 and is movably fitted with the drive spring 33, the other end of the drive spring 33 is connected to the lock bolt 2 in a restricted manner, and the drive spring 33 has a length longer than a travel of the lock bolt 2 moving back and forth, which enables the lock bolt 2 to be fully extended and retracted when the drive spring 33 is driven with the guide post 35.

Embodiment 3

Figure 10:
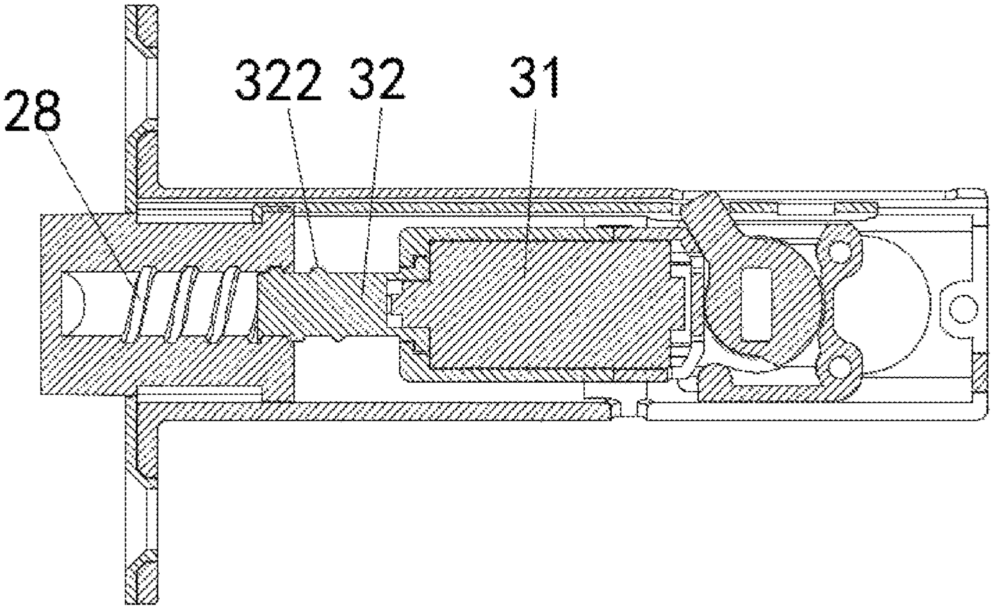
FIG. 10 shows a sectional structure schematic diagram of a lock body in embodiment 3 of the present disclosure.

Implementation of this embodiment is substantially the same as that of the Embodiment 1, except that a specific structural setup of the drive unit 3. Referring to FIG. 10, the drive unit 3 of this embodiment includes a rotating shaft 32 connected to the motor 31, and the rotating shaft 32 is provided with external threads 322 on an outer side of a front end thereon. The lock bolt 2 is provided with threaded holes 28 inside adapted to the external threads 322 of the rotating shaft 32, and between the rotating shaft 32 and the lock bolt 2 is driven by means of the external threads 322 and the threaded holes 28, the lock bolt 2 can realize the forward and backward telescopic movement based on the rotation of the motor 31.

The foregoing description is only some preferred embodiments of the present disclosure, as long as the technical solutions for realizing the purpose of the present invention by essentially the same means are within the scope of the protection of the present invention.

What is claimed is:

1. A full-automatic single bolt lock body, comprising a lock case, a lock bolt and a drive unit;

wherein an end of the lock case is provided with a lock bolt hole for extending and retracting the lock bolt;

wherein the drive unit is mounted in the lock case and is connected to the lock bolt; and wherein the drive unit comprises a built-in motor, the built-in motor is mounted at a rear side of the lock bolt, an axial direction of the built-in motor is in the same direction as a telescopic movement of the lock bolt, and the lock bolt realizes actions of extending and retracting the lock bolt hole based on a rotation of the built-in motor;

wherein the drive unit further comprises a rotating shaft connected to the built-in motor, a drive spring for driving and controlling a movement of the lock bolt, and a reset spring for elastic extension return after the lock bolt has retracted;

wherein an outer side of the rotating shaft is provided with a guide post projecting along a radial direction;

wherein one end of the drive spring is sleeved on the outer side of the rotating shaft, the guide post passes through a pitch of the drive spring and is movably fitted with the drive spring, the other end of the drive spring is connected to the lock bolt in a restricted manner, and the reset spring rests against the rear side of the lock bolt.

2. The full-automatic single bolt lock body according to claim 1, wherein the drive spring has an elastic coefficient greater than an elastic coefficient of the reset spring.

3. The full-automatic single bolt lock body according to claim 1, wherein the lock bolt comprises a lock bolt body and a rear sealing plate;

wherein the lock bolt body inside is provided with a movable cavity for accommodating the drive spring, the movable cavity passes through a rear face of the lock bolt body, and the drive spring is mounted in the movable cavity; and wherein the rear sealing plate is fixedly connected to the rear face of the lock bolt body to enclose the drive spring in the movable cavity, and the rear sealing plate is opened with a movable through hole connected to the movable cavity, and an end of the rotating shaft passes through the movable through hole to connect the drive spring.

4. The full-automatic single bolt lock body according to claim 3, wherein an outer side of the movable cavity is provided with a limit slot for restricting rotations of the drive spring, and a head of the drive spring is snap-fitted in the limit slot.

5. The full-automatic single bolt lock body according to claim 1, the lock case inside is further mounted with a handle connection component for connecting a handle, the handle connection component comprises a rotating member provided with a handle hole, a handle seat for positioning and mounting the rotating member, and a pull rod for connecting the lock bolt;

wherein the rotating member is mounted in the handle seat, and the handle seat is movably mounted in the lock case; and wherein the pull rod is opened with at least two positioning holes for positioning a position of the handle connection component, and an outer side of the rotating member is provided with a push block for positioning in conjunction with the positioning holes.

6. The full-automatic single bolt lock body according to claim 5, wherein an outer side of the lock bolt is provided with a slide groove, an end of the pull rod is provided with a connecting hook for sliding fit with the slide groove, and a rear end of the slide groove is closed by the rear sealing plate; and wherein the connecting hook is hooked to an end face of the rear sealing plate when the lock bolt is in a fully extended state, and the connecting hook slides inside the slide groove when the lock bolt is retracted backwardly under a drive of the built-in motor or under a compression of the lock bolt by an external force.

7. The full-automatic single bolt lock body according to claim 6, wherein it is provided two slide grooves, the two slide grooves are symmetrically disposed with respect to a center on the outer side of the lock bolt, and a connecting groove is provided between the two slide grooves.

8. The full-automatic single bolt lock body according to claim 1, wherein the drive unit comprises a rotating shaft connected to the built-in motor and a drive spring for driving and controlling a movement of the lock bolt;

wherein an outer side of the rotating shaft is provided with a guide post projecting along a radial direction; and wherein one end of the drive spring is sleeved on the outer side of the rotating shaft, the guide post passes through a pitch of the drive spring and is movably fitted with the drive spring, the other end of the drive spring is connected to the lock bolt in a restricted manner, and the drive spring has a length longer than a travel of the lock bolt moving back and forth.

9. The full-automatic single bolt lock body according to claim 1, wherein the drive unit comprises a rotating shaft connected to the built-in motor, and the rotating shaft is provided with external threads on an outer side of a front end thereon; and wherein the lock bolt is provided with a threaded hole inside adapted to the external threads of the rotating shaft, and between the rotating shaft and the lock bolt is driven by means of the external threads and the threaded holes.

* * * * *